United States Patent
Danner et al.

(10) Patent No.: US 7,328,269 B1
(45) Date of Patent: Feb. 5, 2008

(54) APPARATUS AND METHOD FOR PROVIDING SERVER STATE AND ATTRIBUTE MANAGEMENT FOR VOICE ENABLED WEB APPLICATIONS

(75) Inventors: Ryan Alan Danner, Richmond, VA (US); Steven J Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 820 days.

(21) Appl. No.: 10/799,618

(22) Filed: Mar. 15, 2004

Related U.S. Application Data

(63) Continuation of application No. 09/461,191, filed on Dec. 15, 1999, now Pat. No. 6,711,618.

(60) Provisional application No. 60/152,316, filed on Sep. 3, 1999.

(51) Int. Cl.
G06F 15/16 (2006.01)
G06F 1/12 (2006.01)

(52) U.S. Cl. ............. 709/228; 709/203; 709/223; 709/250; 707/9; 714/4

(58) Field of Classification Search ........... 709/228, 709/203, 227, 223, 250; 707/9; 714/4
See application file for complete search history.

(56) References Cited

U.S. PATENT DOCUMENTS

| | | | | |
|---|---|---|---|---|
| 4,837,798 | A | * | 6/1989 | Cohen et al. ........... 379/88.14 |
| 6,098,093 | A | * | 8/2000 | Bayeh et al. ........... 709/203 |
| 6,178,457 | B1 | * | 1/2001 | Pitchford et al. ........... 709/228 |
| 6,233,318 | B1 | | 5/2001 | Picard et al. |
| 6,240,391 | B1 | | 5/2001 | Ball et al. |
| 6,269,336 | B1 | | 7/2001 | Ladd et al. |
| 6,539,494 | B1 | * | 3/2003 | Abramson et al. ........... 714/4 |
| 6,549,612 | B2 | | 4/2003 | Gifford et al. |
| 2001/0011274 | A1 | * | 8/2001 | Klug et al. ........... 707/9 |
| 2001/0011304 | A1 | * | 8/2001 | Wesinger et al. ........... 709/227 |
| 2002/0169820 | A1 | * | 11/2002 | Sayan et al. ........... 709/203 |

OTHER PUBLICATIONS

Extensible Markup Language (XML) 1.0 World Wide Web consortium, Feb. 10, 1998.*
XML in 10 points, Mar. 27, 1999, 3 pages, BERT BOS.
Extensible Markup Language (XML) 1.0, World Wide Web Consortium, Feb. 10, 1998.

* cited by examiner

*Primary Examiner*—Zarni Maung
(74) *Attorney, Agent, or Firm*—Leon R. Turkevich

(57) ABSTRACT

A unified web-based voice messaging system provides voice application control between a web browser and an application server via an hypertext transport protocol (HTTP) connection on an Internet Protocol (IP) network. The application server generates and maintains a server-side data record, also referred to as a "brownie", that includes application state information and user attribute information for an identified user session with the web browser. The application server, in response to receiving a new web page request from the browser, initiates a web application instance to begin a transient application session with the browser. The brownie also includes a session identifier that uniquely identifies the session with the user of the application session. The application server stores the brownie in a memory resident within the server side of the network, and sends to the browser the session identifier and the corresponding web page requested by the web browser.

62 Claims, 6 Drawing Sheets

APPARATUS AND METHOD FOR PROVIDING SERVER STATE AND ATTRIBUTE MANAGEMENT FOR VOICE ENABLED WEB APPLICATIONS

CROSS REFERENCE TO RELATED APPLICATIONS

This application is a continuation of application Ser. No. 09/461,191, filed Dec. 15, 1999 now U.S. Pat. No. 6,711,618, which claims priority from provisional application No. 60/152,316, filed Sep. 3, 1999, the disclosure of which is incorporated in its entirety herein by reference.

BACKGROUND OF THE INVENTION

1. Field of the Invention

The present invention relates to web browser-enabled control of audio operations for voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

FIG. 1 is a diagram illustrating the existing public switched telephone network. As shown in FIG. 1, the public switched telephone network 10 includes a wireline subnetwork 12, a wireless subnetwork 14, and a time division multiplexed (TDM) backbone subnetwork 16 configured for transporting voice data and other data between user devices 18 according to the existing public switched telephone network protocols. The subnetwork 16, for example, includes interexchange trunks for transporting voice data between interexchange carriers and/or local exchange carriers.

As shown in FIG. 1, the wireline subnetwork 12 includes telephony application servers 20 configured for providing voice applications 22 such as subscriber profile management, voice mail, call forwarding, etc. for the user devices 18a, 18b, and 18c coupled to the wireline subnetwork 12. As recognized in the art, the telephony application servers 20 include advanced intelligent network (AIN) components such as services control point (SCP) directories and service nodes (SN) configured for controlling the telephony applications 22. The wireline subnetwork 12 also includes telephony access services 24 configured for providing the user devices 18a, 18b, and 18c access to the wireline subnetwork 12 using, for example, analog twisted pair connections or ISDN connections to a central office. The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the application 22 or the protocol used to interface with the wireline subnetwork 12.

The wireless subnetwork includes wireless application servers 26, and wireless access services 28 for providing wireless voice and data services to the wireless user devices 18d, 18e, and 18f. The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, interact with the wireless application 30 based on respective wireless protocols controlled by the wireless access services 28. The wireless application servers 26 control wireless services such as home location register (HLR) management, and service node (SN) telephony applications. "Tiny clients" are distinguishable from skinny clients in that the tiny clients tend to have even less functionality in providing input and output interaction with a user, and may not be able to send or receive audio signals such as voice signals at all. Examples of tiny clients include wireless user devices 18d, 18e, and 18f, as well as function-specific terminal devices. Note that tiny clients tend to be one-way (receive-only or transmit-only) devices.

In both cases, however, both skinny clients and tiny clients have no control of the respective applications 22 and 30 that are running within the respective networks. Rather, the applications 22 and 30 are executed exclusively by the servers 20 and 26. Moreover, both skinny clients and tiny clients have no control of the access protocol used to access the respective subnetworks 12 and 14; hence, the skinny clients and tiny clients are currently incapable of initiating access to another network using an alternative protocol, for example Internet protocol (IP). Consequently, the skinny clients and tiny clients rely exclusively on the service nodes of the servers 20 and 26 to provide the voice application services programmed in the applications 22 and 30, respectively. Although this exclusive control of the applications 22 and 30 by the servers 20 and 26 is advantageous in maintaining control over quality of service and reliability requirements, the applications 22 and 30 can only be developed and maintained by programmers having sufficient know-how of the public switched telephone network infrastructure. As a result, programmers familiar with open standards such as IP are unable to provide contributions in enhancing the applications 22 and 30 due to the limitations of the public switched telephone network paradigm.

FIG. 2 is a diagram illustrating the web client-server paradigm of an open standards-based IP network 40, such as the World Wide Web, the Internet, or a corporate intranet. The IP network 40 provides client-server type application services for clients 42a and 42b by enabling the clients 42 to request application services from remote servers using standardized protocols, for example hypertext transport protocol (HTTP). For example, the client 42a is a stand-alone personal computer or workstation that has its own application 44 for providing its own application services. The client 42a can access a remote web application server 46 that executes a different set of application services 48 via an IP-based packet switched network 50 using either remote access services 52 or local area network access services 54, if available. Similarly, the client 42b having only a browser 56 can also enjoy the services of the applications 44 and 48 by accessing the respective computers 42a and 46.

The clients 42a and 42b, referred to herein as "fat clients" and "thin clients", respectively, have the distinct advantage that they can initiate requests using IP protocol to any connected web server 46 to execute part or most of the applications 48 on behalf of the clients. An example of a fat client 42*a* is an e-mail application on a PC that knows how to run the application 44 and knows how to run the IP protocols to communicate directly with the messaging server via the packet switched network 50. An example of a thin client 42*b* is a PC that has a web browser; in this case, the web browser 56 can use IP protocols such as HTTP to receive and display web pages generated according to hypertext markup language (HTML) from server locations based on uniform resource locators (URLs) input by the user of the PC.

Hence, the web server paradigm enables the clients 42 to access any web server on the IP network 40. Moreover, the use of open protocols such as HTTP and HTML enable any client 42, regardless of its configuration, to access an HTML web page from a server that has no knowledge of the configuration of the requesting client; if the HTML web page received by the client includes information such as a specific HTML tag that is not recognizable by the browser 56, the browser 56 can merely ignore the unrecognized HTML tag.

Efforts have been made to integrate the telephony applications 22 and 30 directly onto the IP network 40 by developing protocol translators that provide a termination between the telephony applications servers 20 and 26 and the web application servers 46. One such proposal is referred to as voice over IP, where telephony data from the telephony applications 22 and 30 are repackaged into IP packets for transmission across the IP network 50. These efforts, however, still require programmers who have substantial know-how of the telephony applications 22 and 30 and the public switched telephone network infrastructure. Moreover, the repackaging of telephony data into IP packets creates substantial problems in transmission of the telephony data, since the transport of IP data packets is not sequential and synchronous, as required for the voice applications.

Another attempt at performing voice applications over an IP network involves rewriting the telephony applications 22 and 30 as scripts in extensible markup language (XML), and sending the XML scripts over the IP network to an interpreter that is coupled to a telephone. The interpreter then plays the received XML scripts for the telephone. However this approach merely transfers some application functionality from the telephony applications 22 and 30 to the interpreter, and still requires telephony application engineers to write XML scripts of the applications 22 and 30. Hence, the IP network is used only for transporting the XML scripts, and does not take advantage of the open standards-based flexibility of the IP network that has provided enormous growth in web infrastructure and Internet commerce.

As described above, the efforts to date at extending the voice applications 22 and 30 from the public switched telephone network to the IP network 40 have had limited success, primarily because the telephony protocols used in development of the applications 22 and 30 do not operate under the same paradigm as the IP network 40. For example, the telephony applications 22 and 30 are state aware, ensuring that prescribed operations between the application servers 20 or 26 and the user devices 18 occur in a prescribed sequence. For example, operations such as call processing operations, voicemail operations, call forwarding, etc., require that specific actions occur in a specific sequence to enable the multiple components of the public switched telephone network to complete the prescribed operations.

The applications 44 and 48 running the IP network 40, however, are state-less and transient in nature, and do not maintain application state. These applications 44 and 48 are state-less because application state requires an interactive communication between the browser and back-end database servers accessed by the applications 44 and 48. However, an HTTP server provides asynchronous execution of HTML applications: the applications 44 and 48, in response to reception of a specific request in the form of a URL from a client 42, instantiate a program configured for execution of the specific request, send an HTML web page back to the client 42, and end the program that executed the specific request. Hence, all active information about the HTML page or application processed is cleared, with the exceptions of log data.

Although application state information could be passed between the browser 56 and a web application 48 using a data file referred to as a "cookie", some users prefer not to enable cookies on their browser 56; in addition, the passing of a large amount of state information as would normally be required for voice-type applications between the browser 56 and the web application 48 would substantially reduce the bandwidth available for the client 42, rendering use of the cookie infeasible for voice enabled web applications.

In addition, voice application processing may require both the application state information and user specific attributes to intelligently interact with a user. For example, an application server providing voice applications may need user attribute information such as whether a person has a pager, whether the user wants to be notified of new messages on his or her cellphone or pager, what time of day does the user want to be notified via pager or by phone call, etc. Since it is time consuming and resource intensive for an application to access such user attribute information, it becomes impractical for an application to repeatedly obtain this information from a transferred cookie each time the application becomes active to process a submitted browser page. Further, storage of user attributes such as subscription profile information in a cookie creates security concerns, as unauthorized client-side manipulation of the cookie may affect subscriber services, including fraudulent theft of services, improper billing, etc.

SUMMARY OF THE INVENTION

There is a need for an arrangement that enables voice applications to be implemented on an IP packet switched network using the open standards-based flexibility of the IP network.

There is also a need for an arrangement that enables voice applications to be implemented using HTTP and HTML open standards, enabling development of voice applications by individuals that do not have expertise in the public switched telephone network. For example, there is a need for an arrangement that enables voice applications to be designed by web programmers.

There is also a need for an arrangement that enables voice applications to be implemented using an IP network, without the necessity of the public switched telephone network.

There is also a need for an arrangement that enables unified voice messaging services to be provided via an IP network to a web browser, where state and attribute information may be maintained during an interactive voice message service session without passing the state and attribute information between the web browser and the application server.

There is also a need for an arrangement that enables voice application services to be implemented between a web browser and an application server in a manner that maintains security by minimizing passing of information between the web browser and the application server.

These and other needs are attained by the present invention, where an application server configured for executing voice-enabled web applications for a web browser generates and maintains a server-side data record that includes application state information and user attribute information for an identified user session with a web browser. The application server, in response to receiving a new web page request from a browser, upon verifying that a new session with the user is required, creates a transient application session and executes a web application instance to complete the request, and generates the server-side data record including application state information for the application session and user attribute information for the user of the application session. The server-side data record also includes a session identifier that uniquely identifies the session with the user of the application session. The application server stores the server-side data record in a memory resident within the server side of the network, and sends to the browser the session identifier and the corresponding web page requested by the web browser. In response to receiving a second web page request from the browser that includes the session identifier, the application server executes a new web application instance, and recovers the server-side data record from the memory based on the session identifier included in the second page request. Hence, the application server is able to resume processing relative to the prior application state and user attributes specified in the server-side data record, providing a state-full session for the user without the passing of the application state and the user attributes to the browser as cookies.

According to one aspect of the present invention, a method is provided in a server configured for executing web applications. The method includes receiving a first hypertext markup language (HTML) request, via a hypertext transport (HTTP) connection, for a first HTML page for a user. A first HTML page is generated in response to the first HTML request by executing a first web application instance according to a first application state. A data record is stored that specifies the first application state and a corresponding session identifier, and the first HTML page and the session identifier are sent to the user via the HTTP connection. The method also includes receiving via the HTTP connection a second HTML request for a second HTML page, and generating the second HTML page by selectively executing a second web application instance based on the first application state, based on reception of the corresponding session identifier in the second HTML request. Storage of the data record in the server enables the server to provide the appearance of a state-full session for the user, even when there is no continuity between the existence of the first web application instance and the second web application instance. Moreover, maintaining the data record within the server and passing the session identifier between the server and the user minimizes traffic on the HTTP connection and provides optimal security by maintaining within the server sensitive information, such as application state or user profile information.

Another aspect of the present invention provides a processor-based system configured for executing web applications, the system including a hypertext transport protocol (HTTP) interface configured for receiving first and second hypertext markup language requests for first and second HTML pages for a user, respectively, and sending the first and second HTML pages and a session identifier to the user via an HTTP connection. The system also includes an application server configured for executing first and second web application instances for generation of the first and second HTML pages in response to the first and second HTML requests, respectively. The application server stores a data record that specifies a session state with the user upon completion of the first web application instance. The application server also accesses the data record in response to detecting the session identifier in the second HTML request, and executes the second web application instance based on the accessed data record. Storage of the data record by the application server ensures that the application server can instantiate and execute the first web application instance, terminate the first web application instance, and then execute the second web application instance without loss of application state information necessary for state-full applications, such as voice messaging applications. Hence, the application server enables the preservation of transient application state information, enabling multiple application instances executed by the application server to provide the appearance to the user of a single, interactive application session.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to an arrangement for providing unified voice messaging services and data services via an IP network using an application server executing multiple web applications based on stored data records for voice enabled web applications. The ability to provide unified voice messaging services via an IP network enables existing web servers on the World Wide Web or in corporate intranets to support telephone applications on a scalable and economic platform. Moreover, providing unified voice messaging services via an IP network enables use of open standards that permits web programmers to use existing web programming techniques to design and implement voice telephone applications.

Figure 3:
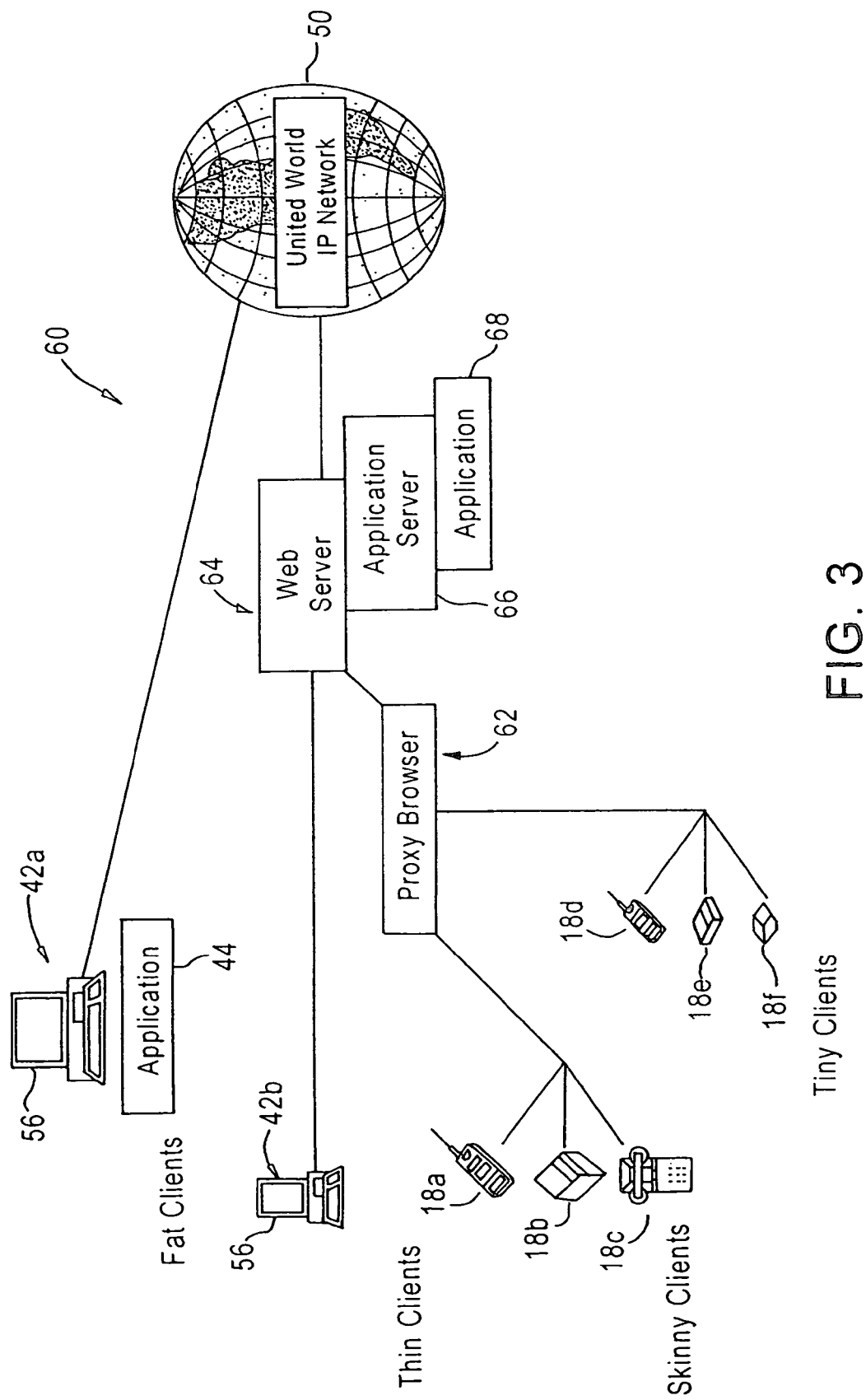
FIG. 3 is a block diagram illustrating a novel paradigm that enables unified voice messaging services and data services to be provided via an IP network using browser audio control according to an embodiment of the present invention.

FIG. 3 is a block diagram illustrating an architecture that provides unified voice messaging services and data services via an IP network using browser audio control according to an embodiment of the present invention. As shown in FIG. 3, each of the clients (tiny clients, skinny clients, thin clients and fat clients) are able to communicate via a single, unified architecture 60 that enables voice communications services between different clients, regardless of whether the client actually has browser capabilities. For example, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The skinny clients 18a, 18b, and 18c and the tiny clients 18d, 18e, and 18f also have access to the unified voice messaging services in the unified network 60 by accessing a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

Figure 1:
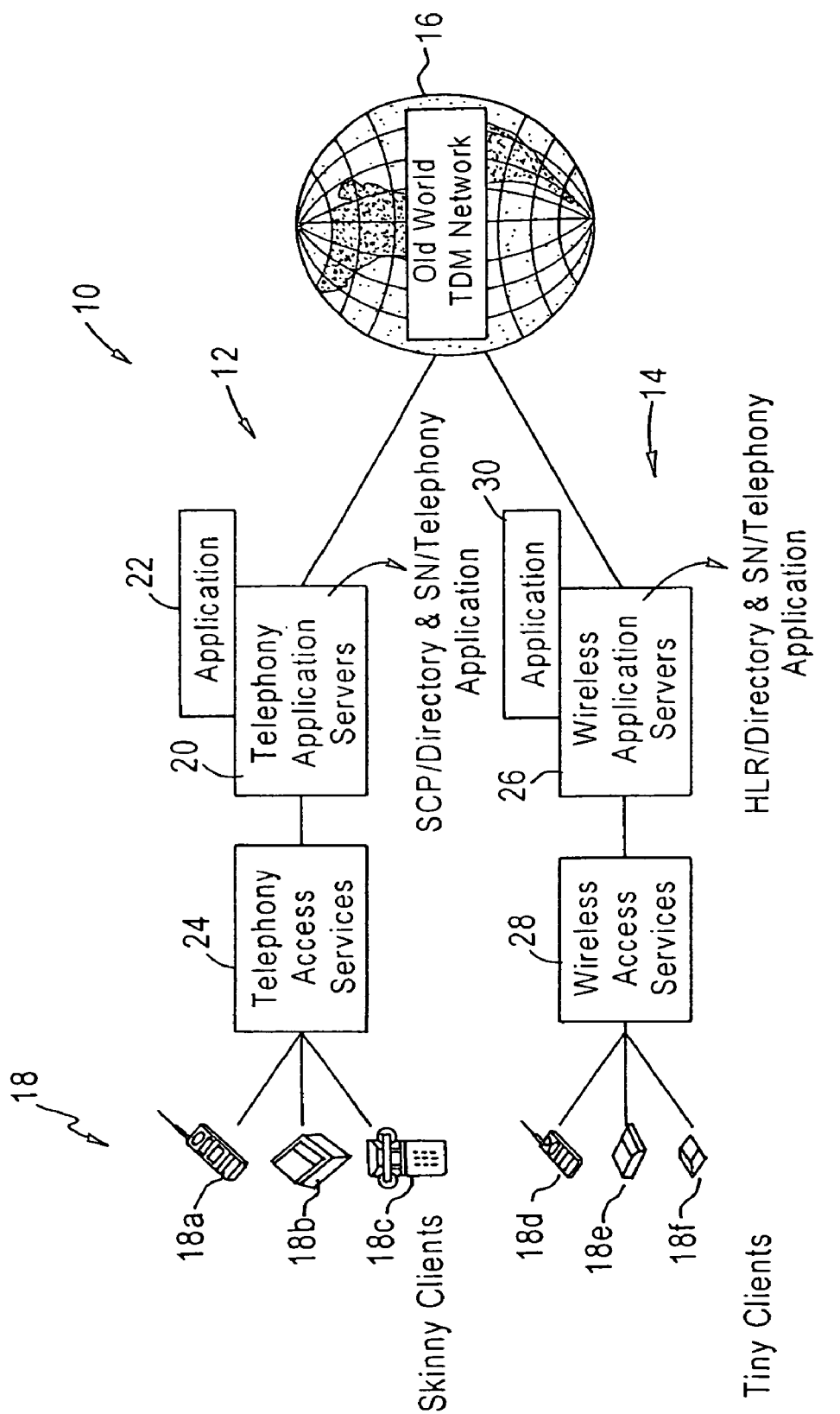
FIG. 1 is a block diagram illustrating an architecture paradigm of the existing public switched telephone network.
Figure 2:
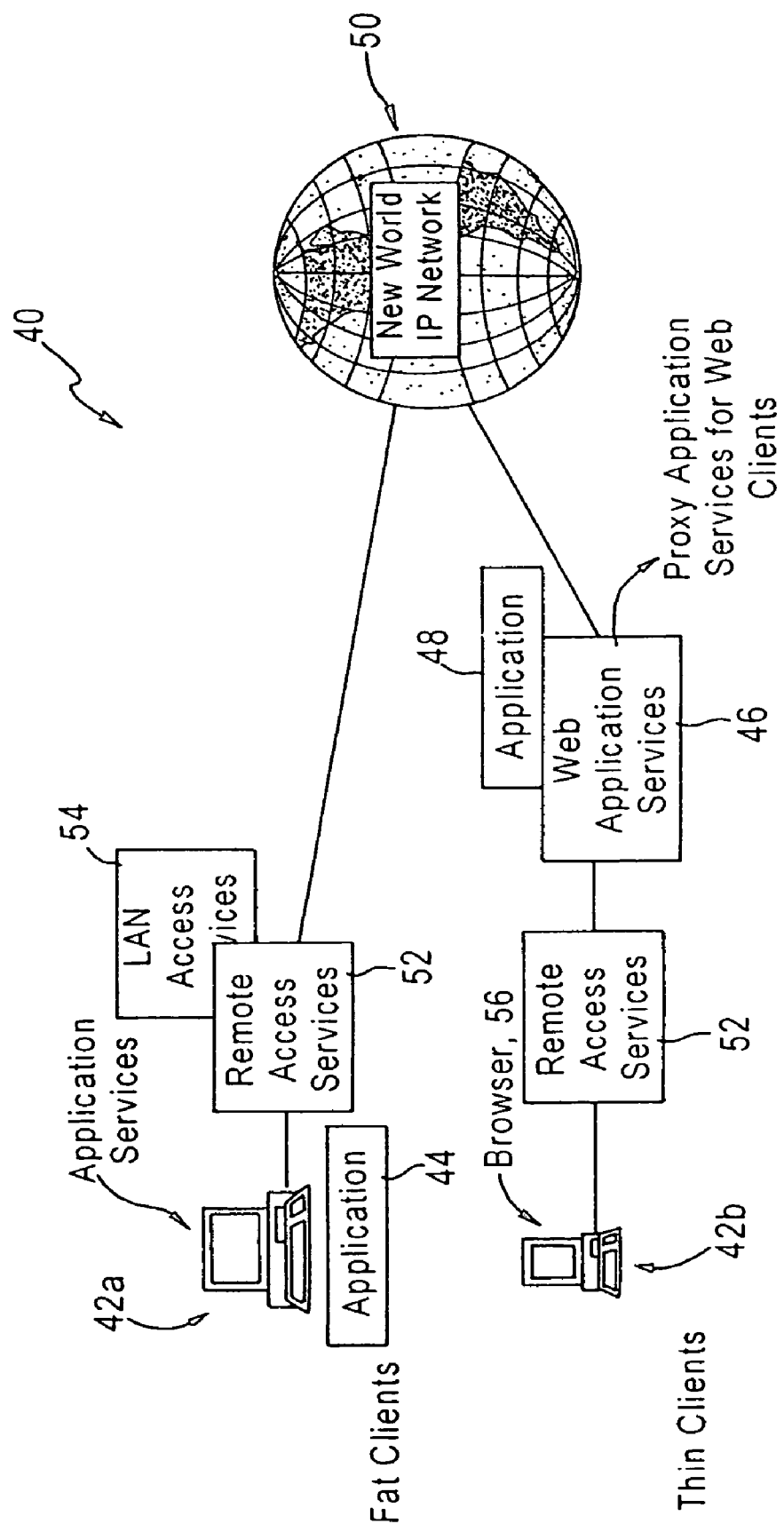
FIG. 2 is a block diagram illustrating an architecture of the existing web client-server paradigm of an Internet protocol (IP) network.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 may be similar to the web application server 46 of FIG. 2 by providing proxy application services for web clients. However, the web server 64 preferably serves as an interface between the browsers and an application server 66 that provides an executable runtime environment for XML voice applications 68. For example, the web server 64 may access the application server 66 across a common Gateway Interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 may either access static XML pages, or the application server 66 may access stored XML application pages (i.e., pages that define an application) and in response generate new XML pages during runtime and supply the generated XML pages to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session. Additional details regarding the brownie are described below with reference to FIGS. 4, 5, and 6.

Figure 4:
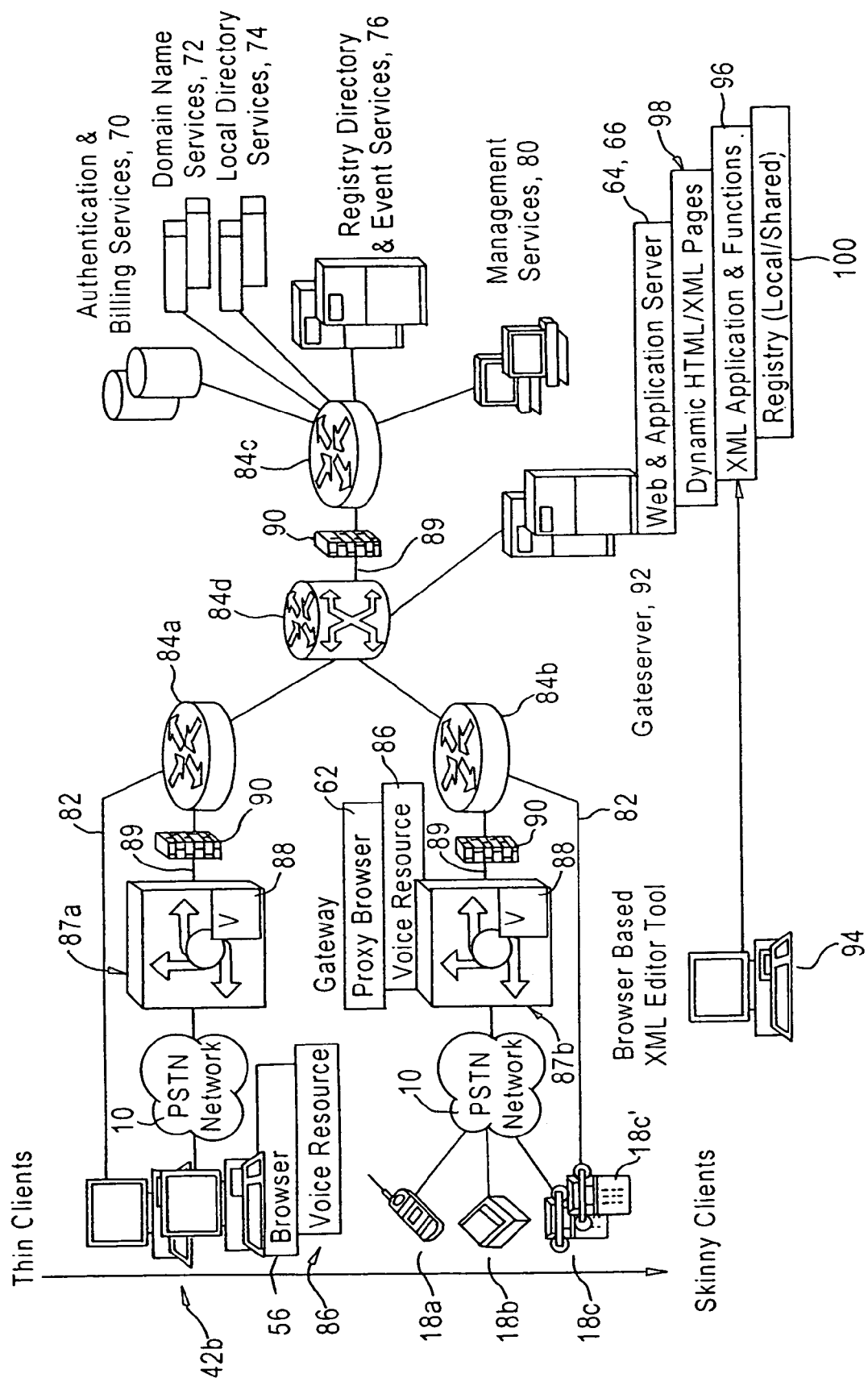
FIG. 4 is a diagram illustrating in further detail implementation of voice applications on the IP network of FIG. 3 including the application server for generating a data record according to an embodiment of the present invention.

FIG. 4 is a diagram that illustrates in further detail the network 60 of FIG. 3. As shown in FIG. 4, the arrangement of providing browser audio control for voice enabled web applications enables voice application services to be implemented in a web server paradigm for many different telephony services, including authentication and billing services 70, domain name services 72, local directory services 74, registry directory and event services 76, and management services 78.

FIG. 4 also illustrates in further detail the browser and web application server interaction. In particular, the thin clients 42b (and fat clients 42a) may be configured for accessing the web server 64 via a direct IP connection 82 to a router 84. The thin client 42b can directly access the web server 64 for voice enabled web application services if the thin client 42b has a browser 56 and an executable voice resource 86, for example an executable XML aware plug-in resource, or a Java applet embedded within a received HTML page. Alternatively, the thin client 42b may access the web server 64 via the public switched telephone network 10, where an IP gateway 87a includes a voice over IP interface 88 that sends information to the server 64 using an HTTP connection 89 via a firewall 90.

Since the skinny clients and tiny clients 18 do not have browser resources, the skinny clients and tiny clients 18 access the proxy browser 62 via the PSTN 10 and the IP gateway 87b. The IP gateway 87b includes both a proxy browser 62 and a voice resource 86, enabling the IP gateway 87 to provide all audio control service for the skinny clients and tiny clients 18. Hence, the PSTN 10 is used merely for transfer of analog audio signals, with intelligent application processing being provided by the proxy browser 62. Note that if one of the telephones 18c' is an IP telephone, then it can access the server 64 via an IP connection 82; in this case, the browser internal to the IP telephone 18c' would process only audio functions, and would ignore any tags associated with text or image content.

As shown in FIG. 4, the web server 64, the application server 66, and the voice web applications 68 reside within a gateserver 92. The gateserver 92 includes a browser based XML editor tool 94 that enables a web programmer to design voice applications using XML pages. The XML pages are stored as XML applications and functions 96, for example within a database accessible by the application server 66. The XML pages stored within the XML application and functions 96 may be stored as static pages to be fetched by the web server 64 and supplied to a browser, however the XML pages may also define the actual application to be executed by the application server 66 in runtime.

Hence, the application server 66 may execute stored XML applications and functions 96, and in response generate dynamic HTML having XML tags, also referred to as HTML/XML pages.

According to the disclosed embodiment, the browsers 56 and 62 provide audio control for voice enabled web applications based on the HTML-XML pages supplied by the application server 66 to the web server 64 for transport across an HTTP connection. The application server 66 executes stored XML applications, also referred to generally as a web applications, in response to HTML requests from the user. During execution of the stored XML applications, the application server 66 stores in a registry 100 a data record, also referred to as a "brownie", that specifies the application state for a given XML application instance. The registry 100 may be local to the application server 66, or alternately may be remote to the application server 66 and stored in another server; in the latter case, the registry 100 may store data records that may be accessible by different application servers 66, enabling multiple application servers to share distributed application services. If desired, the application server 66 may forward the locally-stored data record to another server requesting the data record for distributed application processing.

Figure 5:
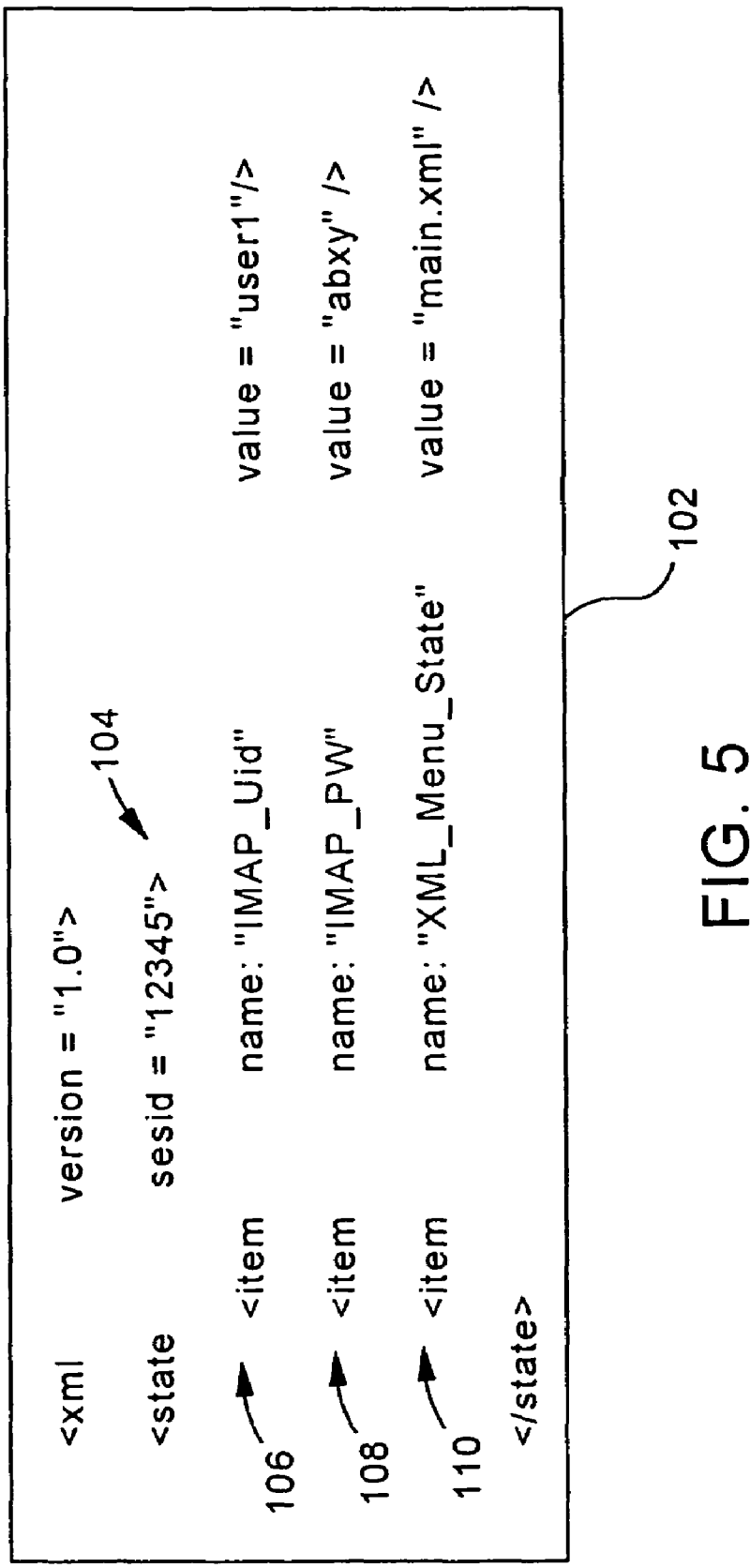
FIG. 5 is a diagram illustrating a data record generated and stored by the application server of FIG. 4 for preservation of application state and user attributes according to an embodiment of the present invention.

FIG. 5 is a diagram illustrating a brownie 102 that specifies application state and user attribute information according to an embodiment of the present invention. As shown in FIG. 5, the brownie 102 is implemented as an XML document that includes XML tags that specify the application state and user attribute information. For example, the brownie 102 includes an XML tag 104 that specifies a session identifier ("sesid") for a unique application session. As described below, the application server 66 generates a unique session identifier 104 for each brownie 102, enabling each user to have his or her own unique brownie 102 for a given interactive user session.

The application server 66 also generates XML tags 106 and 108 that specify attributes for the user. These tags are data fields as retrieved by an application instance and stored in the brownie in order to maintain persistence. For example, the XML tag 106 identifies the user identifier as "user1", where the value "user1" specifies a unique user ID. The unique user ID in tag 106 may be used as the login to an IMAP mailbox, an ID for a pager, and the like. The XML tag 108 specifies a password state for the corresponding user; for example the XML tag 108 may specify the password to be entered by the user (e.g., "abxy"), or alternately the XML tag 108 may specify that the user has already been authenticated during a previous interaction during the same user session specified in the session identifier 104.

The application server 66 also generates an XML tag 110 that specifies the application state with the user. For example, the state "XML_Menu_State" specifies that the last page executed by the application server 66 for the corresponding session ID "12345" was the XML application page "main.xml". Hence, the application server 66, upon determining that the prior application state was "main.xml", may be able to determine the next subsequent page that needs to be generated for the user session based on the user input. For example, if the user input was a value of "2", the application server 66 would be able to interpret the input as selection "2" from a previously supplied main menu; hence, the application server 66 could execute the XML application that corresponds to selection "2" from the main menu of the user session, providing the perception to the user of a state-full interactive voice application.

Figure 6:
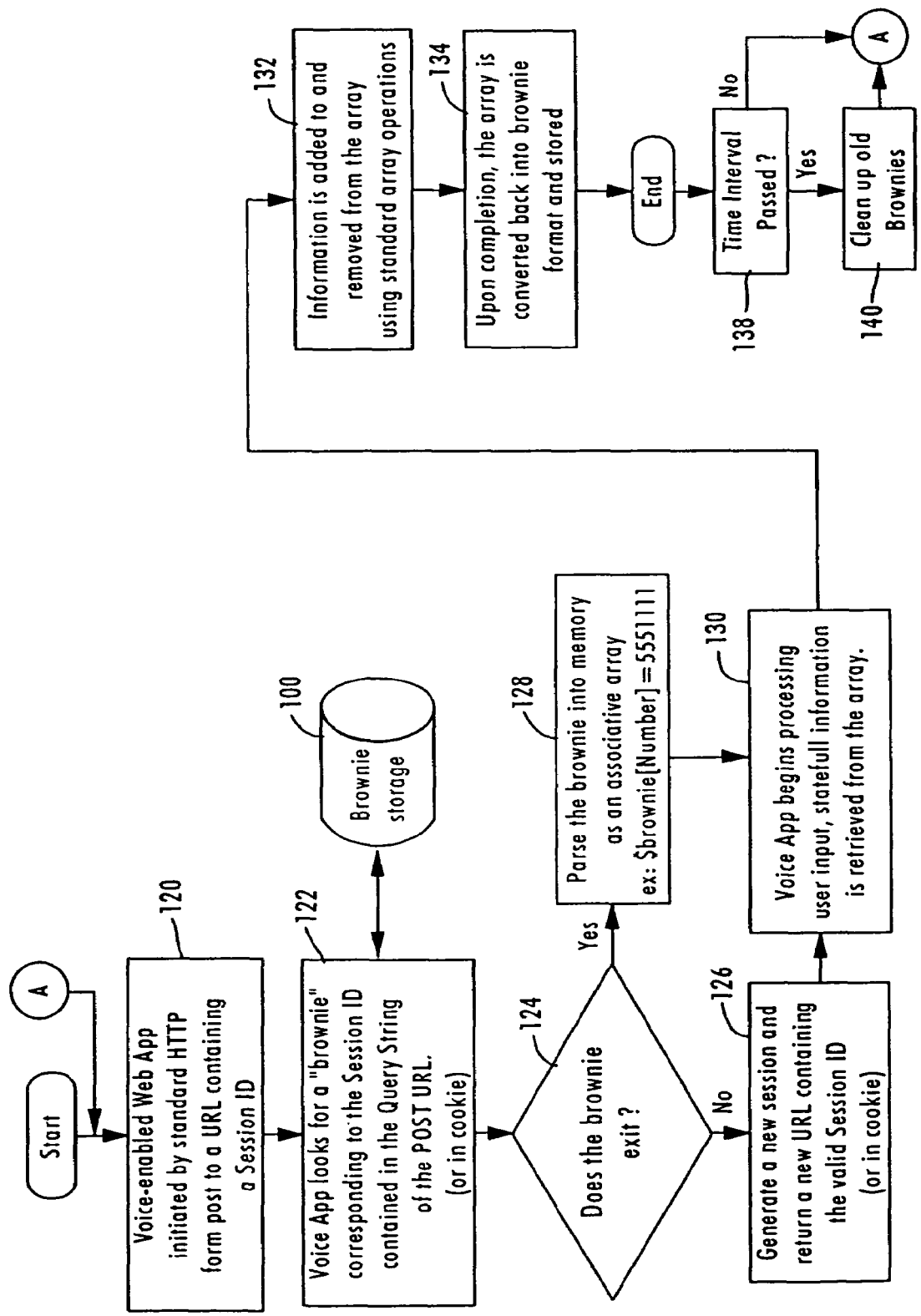
FIG. 6 is a flow diagram illustrating a method of generating a data record for preservation of application state for voice enabled web applications according to an embodiment of the present invention.

FIG. 6 is a diagram illustrating a method of executing web application instances using a data record to store application state information according to an embodiment of the present invention. The steps described in FIG. 6 can be implemented as computer code that is stored on a computer readable medium (e.g., a hard disk drive, a floppy drive, a random access memory, a read only memory, an EPROM, a compact disk, etc).

The method begins in step 120 by the application server 66 initiating execution of the first web application instance in response to receiving an HTML request from a user. Specifically, the web application instance is initiated by the application server 66 in response to reception of a standard HTTP form post to a URL containing a session identifier. Alternately, a new session may be initiated upon detection of a standard HTTP form post to a default URL.

In response to detecting the session identifier in the HTML request, the application server 66 in step 122 searches for a brownie 102 in the storage registry 100 that corresponds to the session identifier contained in the query string of the post URL; alternatively, the session identifier may be specified in a cookie supplied by the browser 56 or 62 along with the HTTP request (e.g., the standard HTTP form post to the default URL). If in step 124 the application server 66 determines that the brownie does not exist for the supplied session identifier, the application server 66 generates a new session in step 126 and returns a new URL containing the valid session identifier (alternately, the new session ID may be supplied in a cookie to the browser). However if in step 124 the application server 66 determines that a brownie 102 exists for the corresponding session identifier 104, the application server 66 in step 128 parses the brownie 102 into an internal memory as an associative array.

The application server 66 then begins execution in step 130 of a selected web application instance based on the user input and the application state 108 supplied in the corresponding brownie 102. The application server 66 selectively adds and removes state information from the associative array, used to temporarily store state and user attribute information, during the execution of the web application instance in step 132. Upon completion of the execution of the web application instance in step 134, the application server 66 converts the information stored in the associative array back into a brownie format 102, stores the brownie back into the registry 100, and terminates the executed web application instance.

Hence, the application server 66 is able to maintain state information for a user session, giving the appearance of a single, interactive application, the application server 66 actually executes separate web application instances for each user request, using the data record 102 to maintain application state and user attribute information. Hence, the application server 66 can provide the appearance of an interactive voice response system that provides intelligent decisions based on the user profile and based on the current position of the user within a menu structure.

The application server 66 may also include an aging function, where data records 102 are removed from the registry 100 in step 140 after a prescribed time interval has passed in step 138. This aging function not only controls the storage requirements for the registry 100, but also provides enhanced security by maintaining the data records 102 for a limited period of time, for example five minutes; hence, any hackers that may access the brownies 102 will be unable to utilize the compromised brownies 102 once the prescribed time interval has passed.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a server configured for executing web applications, the method comprising:
   receiving a first markup language request, via a transport connection, for a first markup language page for a user;
   generating the first markup language page in response to the first markup language request by executing a first web application instance according to a first application state;
   storing a data record that specifies the first application state and a corresponding session identifier;
   sending the first markup language page and the session identifier to the user via the transport connection;
   receiving via the transport connection a second markup language request for a second markup language page; and
   generating the second markup language page by selectively executing a second web application instance based on the first application state, based on reception of the corresponding session identifier in the second markup language request; wherein:
   the step of generating the first markup language page includes inserting a first voice web application parameter and terminating the first web application instance upon sending the first markup language page;
   the step of generating the second markup language page includes (1) initiating the second web application instance, following termination of the first web application instance, in response to the selection thereof based on identifying the first application state specified in the data record, and (2) inserting a second voice web application parameter, the first and second markup language pages representing respective application states of a web-enabled voice messaging session with the user.

2. The method of claim 1, wherein the storing step includes storing user attribute information that specifies attributes about the user in the data record.

3. The method of claim 2, wherein the step of generating the second markup language page includes executing the second web application instance based on the user attribute information stored in the corresponding data record.

4. The method of claim 3, wherein the storing step includes storing in the user attribute information subscriber profile information that specifies profile and preference settings for the corresponding user.

5. The method of claim 2, further comprising deleting the data record after a prescribed interval.

6. The method of claim 2, wherein the storing step further includes storing the data record as an extensible markup language (XML) document.

7. The method of claim 6, wherein the storing step further includes storing the XML document in a nonvolatile memory locally within the server.

8. The method of claim 7, further comprising forwarding the XML document from the nonvolatile memory to a second server requesting the XML document.

9. The method of claim 6, wherein the storing step further includes storing the XML document in a nonvolatile memory of a second server in communication with the server, the steps of generating the first and second markup language pages each comprising registering with the second server for corresponding access to the XML document.

10. The method of claim 1, wherein the storing step includes:
    registering the first web application instance with a registry and in response creating a registry entry; and
    storing state attributes, generated during execution of the first web application instance and describing the first application state, into the registry entry.

11. The method of claim 1, wherein the step of sending the first markup language page and the session identifier includes adding a tag within the first markup language page that includes a uniform resource locator (URL) that specifies the session identifier.

12. The method of claim 11, wherein the step of generating the second markup language page includes detecting the session identifier within the URL supplied by the second markup language request.

13. The method of claim 1, wherein the step of sending the first markup language page and the session identifier includes sending a cookie that includes the session identifier.

14. The method of claim 13, wherein the step of generating the second markup language page includes detecting the session identifier within a cookie supplied with the second markup language request.

15. The method of claim 1, wherein the transport connection is a hypertext transport (HTTP) connection and the first and second voice web application parameters each include extensible markup language (XML) based parameters.

16. A computer readable medium having stored thereon sequences of instructions for executing web applications by a server, the sequences of instructions including instructions for performing the steps of:
    receiving a first markup language request, via a transport connection, for a first markup language page for a user;
    generating the first markup language page in response to the first markup language request by executing a first web application instance according to a first application state;
    storing a data record that specifies the first application state and a corresponding session identifier;
    sending the first markup language page and the session identifier to the user via the transport connection;
    receiving via the transport connection a second markup language request for a second markup language page; and
    generating the second markup language page by selectively executing a second web application instance based on the first application state, based on reception of the corresponding session identifier in the second markup language request; wherein:
    the step of generating the first markup language page includes inserting a first voice web application parameter and terminating the first web application instance upon sending the first markup language page;
    the step of generating the second markup language page includes (1) initiating the second web application instance, following termination of the first web application instance, in response to the selection thereof based on identifying the first application state specified in the data record, and (2) inserting a second voice web application parameter, the first and second markup language pages representing respective application states of a web-enabled voice messaging session with the user.

17. The medium of claim 16, wherein the storing step includes storing user attribute information that specifies attributes about the user in the data record.

18. The medium of claim 17, wherein the step of generating the second markup language page includes executing the second web application instance based on the user attribute information stored in the corresponding data record.

19. The medium of claim 18, wherein the storing step includes storing in the user attribute information subscriber profile information that specifies profile and preference settings for the corresponding user.

20. The medium of claim 17, further comprising instructions for performing the step of deleting the data record after a prescribed interval.

21. The medium of claim 17, wherein the storing step further includes storing the data record as an extensible markup language (XML) document.

22. The medium of claim 21, wherein the storing step further includes storing the XML document in a nonvolatile memory locally within the server.

23. The medium of claim 22, further comprising instructions for performing the step of forwarding the XML document from the nonvolatile memory to a second server requesting the XML document.

24. The medium of claim 21, wherein the storing step further includes storing the XML document in a nonvolatile memory of a second server in communication with the server, the steps of generating the first and second markup language pages each comprising registering with the second server for corresponding access to the XML document.

25. The medium of claim 16, wherein the storing step includes:
registering the first web application instance with a registry and in response creating a registry entry; and
storing state attributes, generated during execution of the first web application instance and describing the first application state, into the registry entry.

26. The medium of claim 16, wherein the step of sending the first markup language page and the session identifier includes adding a tag within the first markup language page that includes a uniform resource locator (URL) that specifies the session identifier.

27. The medium of claim 16, wherein the step of generating the second markup language page includes detecting the session identifier within the URL supplied by the second markup language request.

28. The medium of claim 16, wherein the step of sending the first markup language page and the session identifier includes sending a cookie that includes the session identifier.

29. The medium of claim 28, wherein the step of generating the second markup language page includes detecting the session identifier within a cookie supplied with the second markup language request.

30. The medium of claim 16, wherein the transport connection is a hypertext transport (HTTP) connection and the first and second voice web application parameters each include extensible markup language (XML) based parameters.

31. A processor-based system configured for executing web applications, the system comprising:
a transport protocol interface configured receiving first and second markup language requests for first and second markup language pages for a user, respectively, and sending the first and second markup language pages and a session identifier to the user via a transport connection; and
an application server configured for executing first and second web application instances for generation of the first and second markup language pages in response to the first and second markup language requests, respectively, the application server storing a data record that specifies a session state with the user upon completion of the first web application instance, the application server accessing the data record in response to detecting the session identifier in the second markup language request, and executing the second web application instance based on the accessed data record wherein:
the application server is configured for terminating the first web application instance upon the sending of the first markup language page,
the application server configured for initiating the second web application instance, following termination of the first web application instance, in response to the selection thereof based on identifying the session state specified in the data record,
the application server configured for inserting first and second voice web application parameters into the first and second markup language pages during execution of the first and second web application instances, respectively the first and second markup language pages representing respective application states of a web-enabled voice messaging session with the user.

32. The system of claim 31, wherein the transport interface includes a web server connected to an Internet Protocol (IP) network.

33. The system of claim 31, further including a local memory for storing the data record for a prescribed time interval.

34. The system of claim 31, further comprising a shared registry for storing the data record, the shared registry configured for supplying the data record to authorized servers.

35. The system of claim 31, wherein the application server is configured for storing within the data record user attribute information that specifies attributes about the user, the application server executing the second web application instance based on the user attribute information in the corresponding accessed data record.

36. The system of claim 35, wherein the application server stores the data record as an extensible markup language (XML) document.

37. The system of claim 31, wherein the application server adds to the first markup language page a tag that includes a uniform resource locator (URL) that specifies the session identifier, the application server accessing the data record in response to detecting the URL specifying the session identifier in the second markup language request.

38. The system of claim 31, wherein the application server sends with the first markup language page a cookie that includes the session identifier, the application server accessing the data record in response to detecting the cookie having the session identifier with the second markup language request.

39. The system of claim 31, wherein the transport interface is a hypertext transport (HTTP) interface and the transport connection is an HTTP connection, the first and second voice web application parameters each including extensible markup language (XML) based parameters.

40. A method in a communications system, the method comprising:
receiving by a proxy browser a request from a user device via a device connection according to a corresponding device protocol, and in response generating in the proxy browser a first markup language request;

outputting the first markup language request by the proxy browser to a server via a transport connection;

receiving by the server the first markup language request via the transport connection, the first markup language request requesting a first markup language page for a user of the user device;

generating by the server the first markup language page in response to the first markup language request by executing a first web application instance according to a first application state;

storing by the server a data record that specifies the first application state and a corresponding session identifier;

sending by the server the first markup language page and the session identifier to the proxy browser via the transport connection;

receiving by the proxy browser the first markup page and the session identifier via the transport connection, and in response providing selected media content specified in the first markup page to the user device via the device connection, the selected media content selected based on the device protocol;

receiving by the proxy browser a second request from a user device via the device connection according to the corresponding device protocol, and in response generating in the proxy browser a second markup language request;

outputting the second markup language request, including the session identifier, by the proxy browser to the server via the transport connection;

receiving by the server via the transport connection the second markup language request for the second markup language page and including the session identifier; and generating by the server the second markup language page by selectively executing a second web application instance based on the first application state, based on reception of the corresponding session identifier in the second markup language request.

41. The method of claim 40, wherein the storing step includes storing user attribute information that specifies attributes about the user in the data record.

42. The method of claim 41, wherein the step of generating the second markup language page includes executing the second web application instance based on the user attribute information stored in the corresponding data record.

43. The method of claim 42, wherein the storing step includes storing in the user attribute information subscriber profile information that specifies profile and preference settings for the corresponding user.

44. The method of claim 41, further comprising deleting the data record by the server after a prescribed interval.

45. The method of claim 41, wherein the storing step further includes storing by the server the data record as an extensible markup language (XML) document.

46. The method of claim 45, wherein the storing step further includes storing the XML document in a nonvolatile memory locally within the server.

47. The method of claim 46, further comprising forwarding by the server the XML document from the nonvolatile memory to a second server requesting the XML document.

48. The method of claim 45, wherein the storing step further includes storing the XML document in a nonvolatile memory of a second server in communication with the server, the steps of generating the first and second markup language pages each comprising registering with the second server for corresponding access to the XML document.

49. The method of claim 40, wherein the storing step includes:

registering the first web application instance with a registry and in response creating a registry entry; and storing state attributes, generated during execution of the first web application instance and describing the first application state, into the registry entry.

50. The method of claim 40, wherein the step of sending the first markup language page and the session identifier includes adding a tag within the first markup language page that includes a uniform resource locator (URL) that specifies the session identifier.

51. The method of claim 40, wherein the step of sending the first markup language page and the session identifier includes sending a cookie that includes the session identifier.

52. The method of claim 40, wherein:

the step of generating the first markup language page includes inserting a first voice web application parameter and terminating the first web application instance upon sending the first markup language page;

the step of generating the second markup language page includes (1) initiating the second web application instance, following termination of the first web application instance, in response to the selection thereof based on identifying the first application state specified in the data record, and (2) inserting a second voice web application parameter, the first and second markup language pages representing respective application states of a web-enabled voice messaging session with the user.

53. The method of claim 40, wherein the transport connection is a hypertext transport protocol (HTTP) connection, and the first markup language page is a Hypertext Markup Language (HTML) page.

54. A system comprising:

a proxy browser configured for receiving first and second requests from a user device via a device connection according to a corresponding device protocol and in response generating in the proxy browser respective first and second markup language requests; and a server comprising:

(1) a transport protocol interface configured receiving the first and second markup language requests for respective first and second markup language pages for a user of the user device, and sending the first and second markup language pages and a session identifier to the proxy browser via a transport connection, and (2) an application server configured for executing first and second web application instances for generation of the first and second markup language pages in response to the first and second markup language requests, respectively, the application server storing a data record that specifies a session state with the user upon completion of the first web application instance, the application server accessing the data record in response to detecting the session identifier in the second markup language request, and executing the second web application instance based on the accessed data record.

55. The system of claim 54, wherein the transport interface includes a web server connected to an Internet Protocol (IP) network.

56. The system of claim 54, wherein the server further includes a local memory for storing the data record for a prescribed time interval.

57. The system of claim 54, wherein the server further includes a shared registry for storing the data record, the shared registry configured for supplying the data record to authorized servers.

58. The system of claim 54, wherein the application server is configured for storing within the data record user attribute information that specifies attributes about the user, the application server executing the second web application instance based on the user attribute information in the corresponding accessed data record.

59. The system of claim 58, wherein the application server stores the data record as an extensible markup language (XML) document.

60. The system of claim 54, wherein the application server adds to the first markup language page a tag that includes a uniform resource locator (URL) that specifies the session identifier, the application server accessing the data record in response to detecting the URL specifying the session identifier in the second markup language request.

61. The system of claim 54, wherein the application server sends with the first markup language page a cookie that includes the session identifier, the application server accessing the data record in response to detecting the cookie having the session identifier with the second markup language request.

62. The system of claim 54, wherein:

the application server is configured for terminating the first web application instance upon the sending of the first markup language page, the application server configured for initiating the second web application instance, following termination of the first web application instance, in response to the selection thereof based on identifying the session state specified in the data record, the application server configured for inserting first and second voice web application parameters into the first and second markup language pages during execution of the first and second web application instances, respectively, the first and second markup language pages representing respective application states of a web-enabled voice messaging session with the user.

* * * * *